United States Patent

Gavrilovic et al.

[11] Patent Number: 5,917,969
[45] Date of Patent: Jun. 29, 1999

[54] LASER MODULATOR

[75] Inventors: Pavle Gavrilovic, Melrose, Mass.; Andrei N. Starodoumov, Leon, Mexico; Iouri O. Barmenkov, Leon, Mexico; Fernando Mendoza-Santoyo, Leon, Mexico

[73] Assignee: Polaroid Corporation, Cambridge, Mass.

[21] Appl. No.: 09/024,535

[22] Filed: Feb. 17, 1998

[51] Int. Cl.[6] .............................. G02B 6/26; G02B 6/42
[52] U.S. Cl. .................... 385/15; 385/1; 385/20; 385/27; 356/345; 356/350; 372/6
[58] Field of Search ................ 385/15, 20, 27, 385/1–4, 28, 30, 31, 39, 127; 372/6, 69; 356/345, 350, 351

[56] References Cited

U.S. PATENT DOCUMENTS

| | | | |
|---|---|---|---|
| 4,964,131 | 10/1990 | Liu et al. | 372/6 |
| 5,231,465 | 7/1993 | Huang et al. | 356/350 |
| 5,255,274 | 10/1993 | Wysocki et al. | 356/345 X |

*Primary Examiner*—Phan Palmer
*Attorney, Agent, or Firm*—Donald F. Mofford; Barry Gaiman

[57] ABSTRACT

An all-optical modulator for modulating the output power of a high-power optical pump source is disclosed. More particularly, with the optical modulator of the invention, the output power of a CW fiber laser is modulated by a low-power laser, such as a diode laser. The modulator comprises two optical couplers which are preferably wavelength-selective and interconnected by a nonlinear single mode optical fiber with a high Raman gain. A laser system comprising a high-power pump laser, a fast signal laser with a suitable modulation depth and the optical modulator of the invention can advantageously employed in materials processing and graphics arts printing applications.

24 Claims, 4 Drawing Sheets

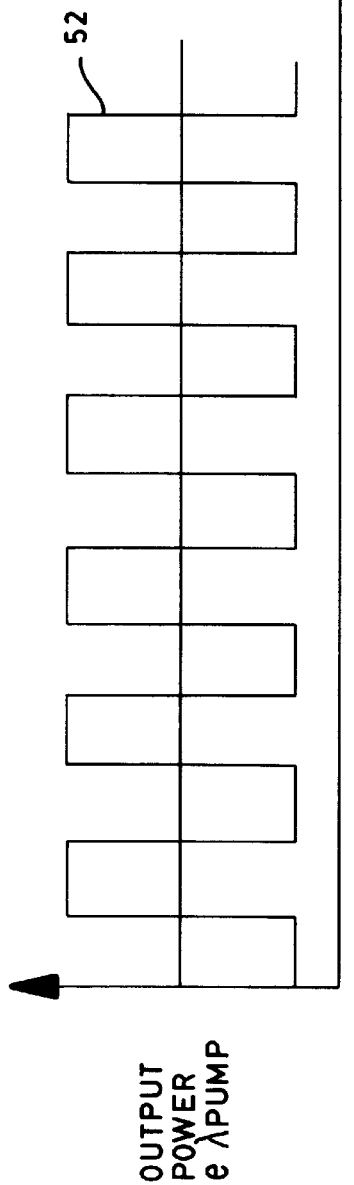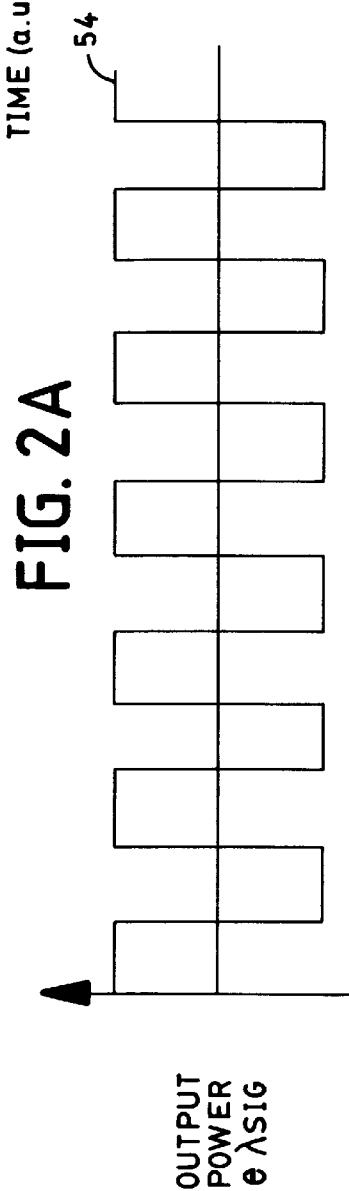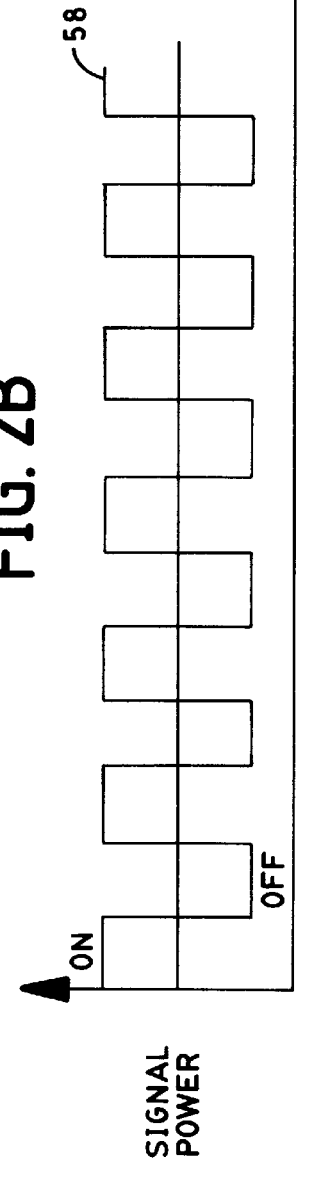

LASER MODULATOR

BACKGROUND OF THE INVENTION

1. Field of the Invention

This invention relates to an all-optical modulator for modulating the output power of a high-power optical pump source. More particularly, the invention relates to an all-fiber modulator wherein the output power of a CW fiber laser is modulated by a low-power laser, such as a diode laser. The modulator comprises two optical couplers which are preferably wavelength-selective and interconnected by a nonlinear single mode optical fiber with a high Raman gain. The likelihood of optical damage in the modulator is greatly reduced due to its all-optical design.

2. Description of Related Art

High power laser sources, in particular solid state lasers such as diode-pumped Nd:YAG and fiber lasers doped with Yb, are known in the art and are increasingly used for materials processing and marking as well as for printing and graphic arts applications where rapid modulation of the high-power optical output is essential. The highest attainable modulation frequency in such lasers through external modulation of the diode pump source is determined by the fluorescence lifetime of the excited state which is in the range of microseconds to milliseconds, making modulation at frequencies above 1 MHz increasingly difficult and inefficient. Consequently, most solid state and fiber lasers emit a continuous (CW) optical output which is subsequently modulated externally by electro-optic or acousto-optic modulators known in the art. This approach reduces the overall efficiency of the system, since the portion of the output energy which is not transmitted by the modulator to the target, is deflected to a "beam stop" and absorbed in the form of heat.

Moreover, electro-optic or acousto-optic modulators require expensive drive electronics and careful alignment with the optical beam. In addition, the optical characteristics of these modulators are temperature-dependent due to the temperature dependence of the physical parameters of the crystals, such as their linear dimensions, refractive index, sound velocity, etc.

With the foregoing in mind, it is therefore an object of the invention to provide an all-optical modulator for high-power laser sources, in particular for fiber lasers, which does not require complicated beam alignment and which is stable with changes of the environmental parameters. It is a further object of the invention to provide a modulator of this type which has a low insertion loss and which can be modulated at frequencies above 1 MHz. The modulator should preferably also have a high extinction ratio and a high damage threshold.

SUMMARY OF THE INVENTION

The object of the invention is solved by an all-optical modulator which operates via a nonlinear optical effect, such as Raman scattering, resulting in a Stokes-shift. In accordance with the invention, the optical output from a high-power pump source is combined in a first optical coupler which is preferably wavelength-selective, with the optical output from a low-power modulated radiation source and injected into a fiber exhibiting Raman gain. In the fiber, in the presence of the modulation signal, a significant amount of the pump power is transferred from the wavelength of the pump signal to the wavelength of the modulation signal which is Stokes-shifted from the pump wavelength, thereby providing a high optical power at the signal wavelength. In a second optical coupler, the Stokes-shifted high-power modulated signal and the likewise modulated pump radiation are separated from each other and conveyed to respective output ports. These output ports can advantageously be coupled directly to respective passive optical fibers for transmission to respective targets, such as parts to be machined or to a radiation-sensitive media for generating and displaying information of intelligence.

Raman-active optical fibers with a high Raman gain are known in the art, for example from the article "Raman-gain estimates for high-gain optical fibers" by M. E. Lines, Journal of Applied Physics, Vol. 62 (11), pages 4363–4370 (1987). High Raman gain was observed, for example, in heavy-metal multi-component germanate and arsenate glasses, making germanium the preferred element due to its comparatively low toxicity.

In a preferred embodiment of the invention, the Raman-active optical fiber is a silica fiber doped with germanium, with the Ge doping level preferably between about 10 and 30%, most preferably about 20%. Ge-doped fibers are known in the art for their high Raman gain.

In another embodiment, the pump radiation and the modulated signal are optically coupled to respective inputs of the optical coupler, wherein the coupler is preferably a wavelength division multiplex (WDM) coupler tuned to the respective wavelengths of the pump radiation and the modulated signal, and combined in the optical coupler for transmission to the Ge-doped fiber which can, for example, be butt-coupled or fusion-spliced to the output of the optical coupler. Most preferably, the optical wavelength of the modulated signal is shifted from the wavelength of the pump radiation by the first Stokes shift of the Ge-doped fiber. Such WDM couplers are known in the art and can be based on filters, gratings or integrated Mach-Zehnder interferometers suitable for optical integration. (See, e.g.: G. P. Agrawal, Fiber-Optic Communication Systems, p. 282–286, John Wiley and Sons, New York, 1992).

In another preferred embodiment, the modulated signal is generated by an electrically modulated laser diode, preferably lasing in a single spatial mode. Alternatively, the modulated signal can be generated by a low-power fiber Raman laser, for example an Yb fiber laser, in combination with an external modulator, such as an electro-optic or acousto-optic modulator.

In yet another preferred embodiment, the high-power pump source is a rare-earth doped fiber laser, wherein the dopant is preferably Nd or Yb.

Advantageously, the input of the second coupler which is also a WDM coupler, is coupled to the output of the Ge-doped fiber to separate the pump wavelength from the modulated signal wavelength. Again, the WDM coupler is tuned to the respective pump and signal wavelengths so that in the ON-state, i.e. when the modulated signal is present at the input of the first WDM coupler, the modulated high-power radiation at the wavelength of the modulated signal which is Stokes-shifted from the pump wavelength, is coupled out at a first output port, and that in the OFF-state (where the modulated signal is not present) the pump power is coupled out at a second output port.

In yet another preferred embodiment, a passive optical fiber is coupled to the pump output to convey the modulated pump radiation to an optical system or directly to a target.

In a preferred embodiment, the Ge-doped fiber has a length of between about 20 m and 150 m; more preferred is a Ge-doped fiber length of between about 55 m and 65 m.

The optimum fiber length depends on the pump input power and the extinction ratio of the modulation signal to suppress unwanted residual Stokes signals. The extinction ratio of the modulation signal is preferably between about 30 and 40 dB.

BRIEF DESCRIPTION OF THE DRAWINGS

Other objects and attainments together with a fuller understanding of the invention will become apparent and appreciated by referring to the following description and claims taken in conjunction with the accompanying drawings.

In the drawings is shown in:

FIGS. 2A to 2C a timing diagram of the respective output power at the pump wavelength and at the signal wavelength in response to the modulated signal input power for the arrangement of FIG. 1;

DESCRIPTION OF THE PREFERRED EMBODIMENTS

Figure 1:
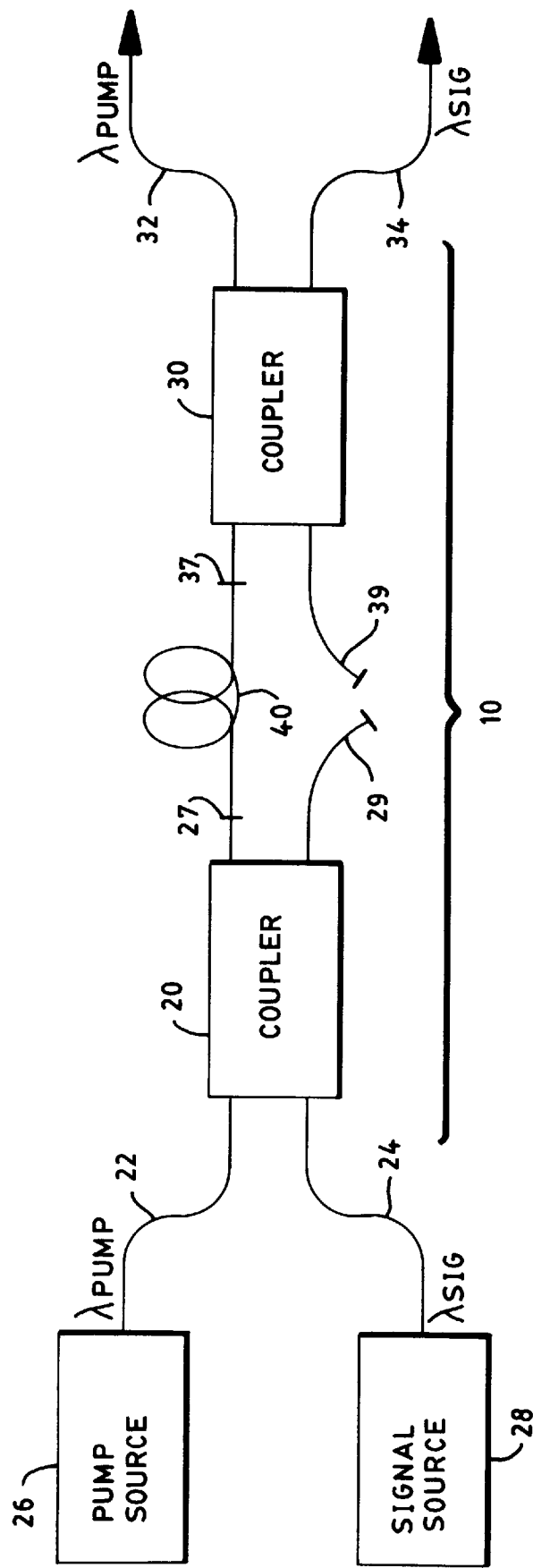
FIG. 1 a diagrammatic illustration of an embodiment of an all-optical modulator of the invention.

Referring first to FIG. 1, there is illustrated diagrammatically an embodiment of an all-optical modulator 10 according to the invention. The modulator 10 is comprised of a first wavelength-selective fiber coupler 20, a nonlinear Raman fiber 40 and a second wavelength-selective fiber coupler 30. Optical pump radiation at a wavelength $\lambda_{PUMP}$ from a pump source 26 is optically coupled into a first input port 22 and modulating signal radiation at a wavelength $\lambda_{SIG}$ from a signal source 28 is optically coupled into a second input port 24 of the first fiber coupler 20. If the pump source 26 and/or the signal source 28 is a fiber laser or another type of laser with a fiber-pigtailed output, then the output of these lasers can, for example, be butt-coupled or fusion-spliced to the wavelength-selective fiber coupler 20. The physical properties, such as the length of the coupling section, the index of refraction, etc., of the fiber coupler 20 are selected in a manner known in the art such that both the pump power and the signal power are transmitted without appreciable loss to an output 27 of the fiber coupler 20. A second output port 29 of coupler 20 serves as a "beam dump" for any residual power which is not transmitted to the output 27 at either the wavelength $\lambda_{PUMP}$ or $\lambda_{SIG}$. The signal at output port 27 is thus a superposition of the pump power at $\lambda_{PUMP}$ and the modulating signal at $\lambda_{SIG}$.

The nonlinear fiber 40 is basically a silica-based fiber with a core and a cladding having a lower index of refraction than the core. This construction of an optical fiber is known in the art. When a pump beam copropagates with a signal beam through the fiber core, power is transferred from the pump beam to the signal beam if the difference in wavelength between the pump beam and the signal beam corresponds to an energy known as Raman energy $\Omega_R$. The wavelength of the pump beam is generally shorter than the wavelength of the signal beam. The length of nonlinear Raman fiber 40 required to increase the optical power of the signal beam at the expense of the pump beam depends on parameters characteristic for the modulator 10, such as the Raman gain $g_R$, the pump intensity $P_{PUMP}/a_{PUMP}$ wherein $P_{PUMP}$ is the incident pump power and $a_{PUMP}$ the cross-section area of the pump beam inside the fiber. The Raman energy $\Omega_R$ is typically in silica glass about 13.2 THz (440 cm$^{-1}$) with a gain bandwidth of about 6 THz. The Raman gain $g_R$ is about 4.4×10$^{-12}$ cm/W in standard non-polarization-maintaining silica fibers at a pump wavelength of about 1.06 μm. The Raman gain scales inversely with $\lambda_{PUMP}$ and increases in fibers doped with GeO$_2$ by a factor (1+0.8Δ) wherein Δ is the relative refractive index difference expressed in percent. The GeO$_2$-doped fiber of the present invention contains preferably from about 10 to 30 mol % GeO$_2$ and has a Raman gain of about 1.05×10$^{-11}$ cm/W at a wavelength of about 1.06 μm.

The conversion of pump power at $\lambda_{PUMP}$ into power at the wavelength $\lambda_{SIG}$ along the longitudinal z direction of the fiber can be described by the following differential equations:

$$\frac{\partial P_{SIG}}{\partial z} = -\alpha_{SIG} P_{SIG} + \frac{g_R}{a_{PUMP}} P_{PUMP} P_{SIG}$$

$$\frac{\partial P_{PUMP}}{\partial z} = -\alpha_{PUMP} P_{PUMP} - \frac{\lambda_{SIG}}{\lambda_{PUMP}} \frac{g_R}{a_{SIG}} P_{SIG} P_{PUMP}$$

$\alpha_{SIG}$ and $\alpha_{PUMP}$ represent the fiber loss at the signal and pump frequencies $\lambda_{SIG}$ and $\lambda_{PUMP}$, respectively. $P_{SIG}$ is the optical power of the signal and $a_{SIG}$ is the cross sectional area of the signal beam inside the fiber. It is assumed that $a_{PUMP} = a_{SIG}$.

Unlike Raman fiber amplifiers used for small-signal amplification, for example for amplifying the information-carrying signals in telecommunication fibers, the fiber modulator 10 of the invention operates in the gain saturation regime where the amplification factor becomes independent of fiber length. This difference is important for the invention and will be discussed in grater detail below.

In the nonlinear Raman fiber 40, the presence of the signal power from signal source 28 at input 24 causes optical power to be transferred from $\lambda_{PUMP}$ to $\lambda_{SIG}$. If no signal power is present at input 24, i.e. the modulating power is in the "OFF" state, then no optical power is transferred from $\lambda_{PUMP}$ to $\lambda_{SIG}$ and essentially only optical power at $\lambda_{PUMP}$ is observed at the fiber end 37. Conversely, when the modulating signal injected at input 24 is in the "ON" state, then optical power is transferred from $\lambda_{PUMP}$ to $\lambda_{SIG}$ and essentially only optical power at $\lambda_{SIG}$ is observed at the fiber end 37. Consequently, at suitable modulation levels of the signal source which will be discussed below, almost the entire pump power supplied at input port 22 is "toggled" between $\lambda_{PUMP}$ and $\lambda_{SIG}$ by the signal source.

The output 37 of the fiber 40 is coupled to an input 37 of the second wavelength-selective fiber coupler 30 which provides the inverse function of the first wavelength-selective fiber coupler 20. Port 39 of the second coupler 30 here serves as a "beam dump" for any radiation reflected from the coupler 30. The design parameters of the second wavelength-selective fiber coupler 30 are chosen such that the pump wavelength at $\lambda_{PUMP}$ is directed towards an output port 32, whereas the signal wavelength at $\lambda_{SIG}$ is directed towards an output port 34.

The wavelength-selective fiber couplers 20 and 30 can be constructed from proximity-coupled optical fibers or filters or can be implemented in the form of integrated optics devices, all of which are known in the art. The pump source 26 is preferably a high-power fiber laser, but can also be another suitable radiation source, such as a conventional solid-state laser or semiconductor laser. The signal source 28 is preferably a semiconductor laser directly modulated by controlling the electrical current, but can also be another fiber laser, Raman laser or any other suitable radiation source. The signal and pump sources are not part of this invention.

As mentioned before, the output power of the modulator 10 can be switched in a wavelength-dependent fashion between output ports 32 and 34 in response to the modulating signal supplied by signal source 28. The corresponding temporal response is illustrated schematically in FIG. 2.

Referring now first to FIG. 2C, curve 58 represents the signal power at input port 24 as a function of time. In the "ON" state, i.e. when the signal source 28 is turned on and the optical power emitted by the signal source 28 is approximately $10^{-4}$ to $10^{-3}$ of the pump power, substantially all pump power is converted to $\lambda_{SIG}$ and conveyed to output port 34, as illustrated in FIG. 2B by curve 54. Conversely, when the signal source 28 is turned off and the optical power emitted by the signal source 28 is below about $10^{-6}$ of the pump power, substantially all pump power is conveyed to output port 32, as illustrated in FIG. 2A by curve 52. As a result, the signals at both output ports 32 and 34 correspond to the modulating signal, with one signal being the complement of the other, and could conceivably be used in the application of the modulator 10. This has a considerable advantage over conventional modulators where about 50% of the pump power is wasted by being directed to a "beam dump".

As will become clear hereinafter, the length of the nonlinear fiber 40 has to be chosen such that any spurious low power radiation present in the fiber 40 at $\lambda_{SIG}$ (amplified "spontaneous" or "residual" radiation) is not substantially converted to radiation at the pump wavelength $\lambda_{PUMP}$ so as to adversely affect the intended application of the device. For example, when printing with the optical power emerging from output port 32 on a threshold media, such as the Helios Laser Film sold by Polaroid Corporation, a power of 10–20% of $P_{PUMP}$ can be tolerated at output port 32 in the "OFF" state of signal source 28.

In addition, the Raman gain of the nonlinear fiber 40 is saturated, i.e. the output power at the respective output ports 32 and 34 becomes essentially independent of the signal power if the ratio of signal power to pump power exceeds a certain value. This value depends on the magnitude of the pump power and the other fiber parameters which enter the differential equations described above.

Figure 3A:
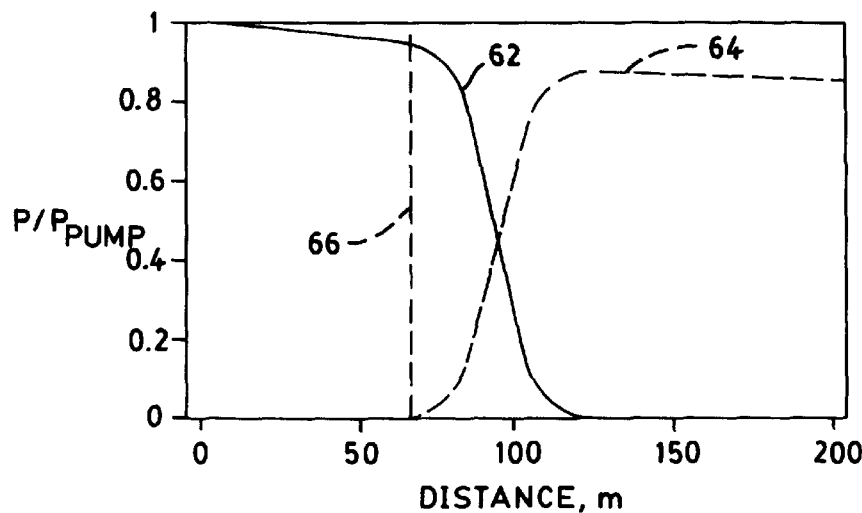
FIGS. 3A to 3C the optical power in the nonlinear fiber normalized to the supplied pump power along the length of the nonlinear fiber for a specific embodiment according to FIG. 1.
Figure 3B:
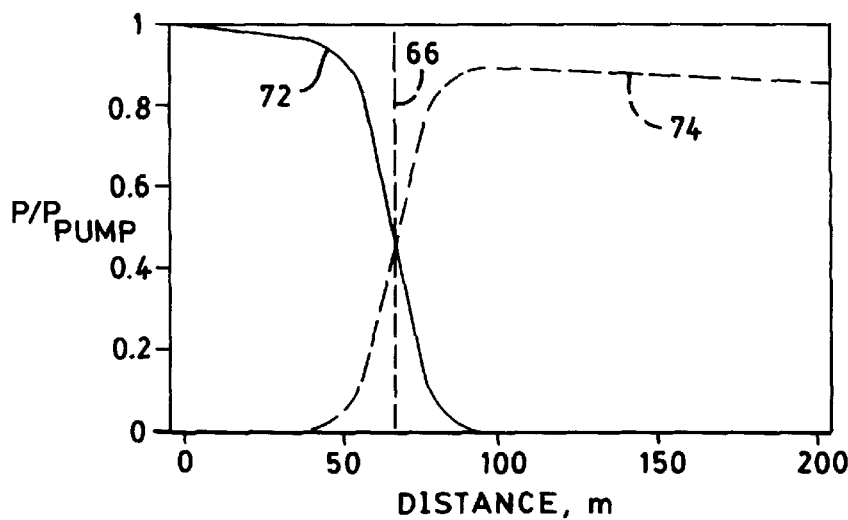
Figure 3C:
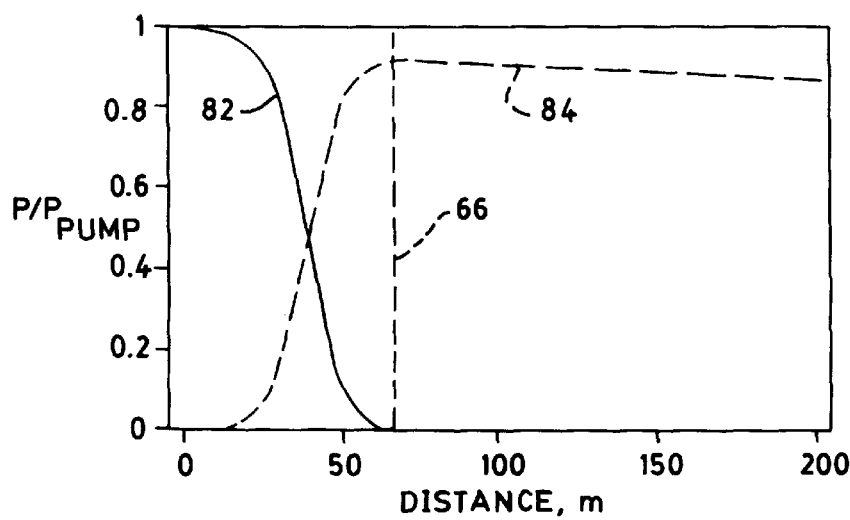

Referring now to FIGS. 3A to 3C, there is depicted the relative optical power $P/P_{PUMP}$ normalized to the supplied pump power of $P_{PUMP}=10$ W along the length of the nonlinear fiber 40 for different ratios of signal power to pump power. The fiber of the present example is doped with 20 mol. % $GeO_2$ and is single mode with a core radius of 1.4 $\mu$m, corresponding to $a_{PUMP}=a_{SIG}=6.2\times10^{-8}$ $cm^2$; the cut-off wavelength is 970 nm and the numerical aperture NA=0.27 (determined by the refractive indices of the core and the cladding, respectively). The Raman gain taken as $g_R=1.05\times10^{-11}$ cm/W and the attenuation $\alpha=2.9$ dB at $\lambda=1.062$ $\mu$m. A pump power of $P_{PUMP}=10$ W is selected. In FIGS. 3A to 3C, the solid lines 62, 72, 82 represents the pump power, whereas the broken lines 64, 74, 84 represents the signal power; both power levels are normalized to the supplied pump power. The gradual decrease of the power levels with distance in the fiber is due to the optical absorption of the signal power and pump power, respectively.

In FIG. 3A, it is assumed that a relative signal power of 1 $\mu$W ($P_{SIG}/P_{PUMP}=10^{-7}$) is injected at the input port 24. Although Raman scattering is a nonlinear effect and therefore rather weak at low power levels, "spontaneously" scattered signal light can be amplified to power levels comparable to that of the pump, if the light travels a sufficient distance in the nonlinear fiber 40. As shown in curve 64, although essentially no signal is present at the input port 24, almost all the pump radiation is disadvantageously transferred from the pump wavelength $\lambda_{PUMP}$ to the signal wavelength $\lambda_{SIG}$ after a distance of about 120 m. The optical power emerging at output port 34 is then independent of the presence of a modulating signal at input port 24, i.e. an increase in the signal power by several orders of magnitude will not appreciably change the power at output port 34. It will therefore be appreciated that for the modulator 10 to operate according to the invention, the nonlinear fiber 40 has to have a limited length. With a fiber length of about 60 m, as seen from curve 62, essentially all optical power is still present at the pump wavelength $\lambda_{PUMP}$.

In FIG. 3B, the relative signal power is increased to 100 $\mu$W, corresponding to $P_{SIG}/P_{PUMP}=10^{-5}$ at the same pump power of 10 W. Such power level can be generated by the signal source 28, for example a semiconductor laser, if the laser is not completely switched off between "ON" states and thus injects a "residual" Stokes signal. The importance of having a sufficient modulation depth, i.e. a sufficiently large ON/OFF-ratio, of the signal source will be discussed in detail below. At the output of an about 60 m long fiber, about 50% of the pump power is converted to the signal wavelength $\lambda_{SIG}$ (curve 74) whereas about 50% remain at the pump wavelength $\lambda_{PUMP}$ (curve 72).

In FIG. 3C, the relative signal power is increased to 10 mW, corresponding to $P_{SIG}/P_{PUMP}=10^{-3}$ while maintaining the pump power at 10 W. A signal power of 10 mW is readily attainable with frequency-stabilized semiconductor lasers, such as DFB lasers, which preferably are pigtailed. As seen from curve 84, after a distance of about 60 m, substantially the entire pump power is converted to the signal power wavelength $\lambda_{SIG}$, whereas the power at $\lambda_{PUMP}$ has decreased to about 1% of its initial value (curve 82). This distance is indicated by a vertical line 66 in FIGS. 3A to 3C. It should be noted that the curves 62, 64, 72, 74, 82, 84 and 66 do not change significantly if the pump power is changed in the range between about 3 W and 10 W.

As will be appreciated by a comparison between FIGS. 3A, 3B and 3C, the output power at the output ports 32 and 34 of the second wavelength-selective fiber coupler 30 can advantageously be modulated by a modulating signal supplied at the input 24 of the first wavelength-selective fiber coupler 20 if the ratio between the power levels of the signal source 28 in the ON-state and the OFF-state is above $10^3$ or 30 dB, preferably $10^4$ or 40 dB. If this ratio is lower, then the extinction ratio of the modulator 10 will be reduced accordingly.

Another advantage of the modulator 10 of the invention is the low insertion loss. In the absence of both the "injected" and the "residual" signal power, the modulator insertion loss is determined by the losses in the fiber caused by optical absorption ($\alpha_{PUMP}$) and by spontaneous Raman scattering.

Figure 4:
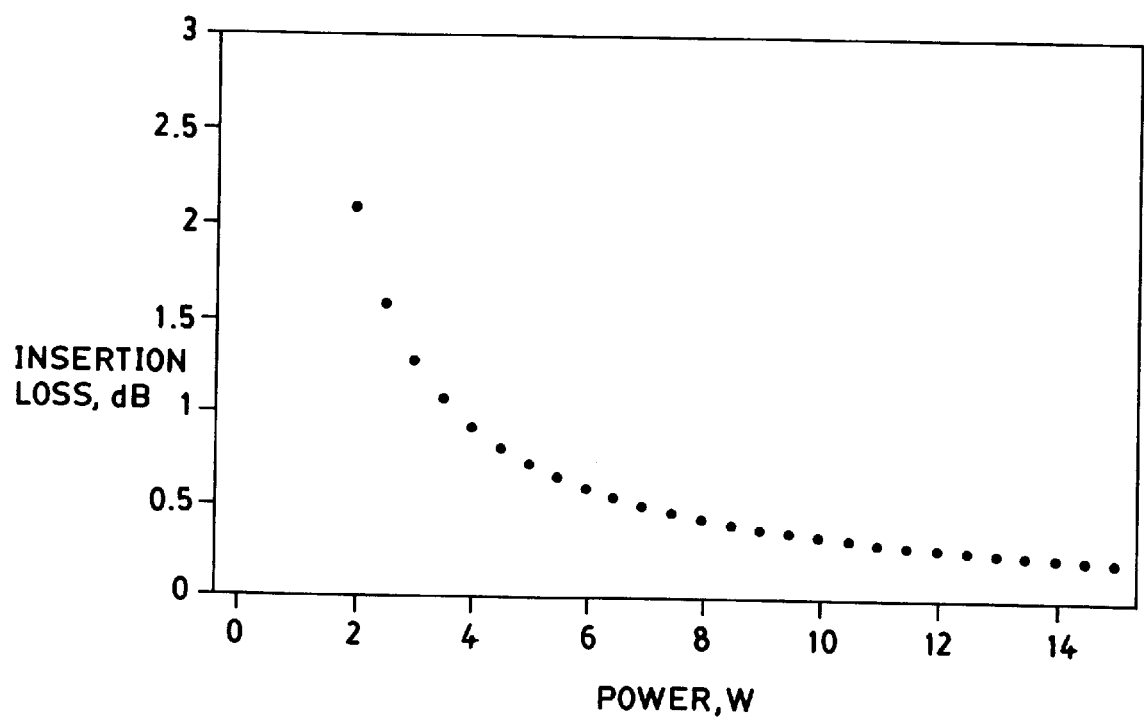
FIG. 4 optimum fiber length and insertion loss as a function of the supplied pump power.

Referring now to FIG. 4, there is shown the insertion loss of the fiber modulator 10 of the invention having an extinction ratio of 20 dB based on a Nd fiber pump laser emitting a pump power of 10 W at a wavelength of 1.062 $\mu$m. As can be seen, the insertion loss tends to decrease with increasing power, in the present example from 0.4 dB at 10 W pump power to 0.2 dB at 15 W pump power. Because the optical losses increase exponentially with germanium concentration, a Raman fiber modulator with lower germanium concentration, such as 10–12 mol % would have an even lower insertion loss.

While there have been described what at present are considered to be the preferred embodiments of the present invention, it will be readily apparent to those skilled in the art that various changes may be made therein without departing from the invention, and it is intended in the claims to cover such changes and modifications as fall within the true spirit and scope of the invention.

What is claimed:

1. A modulator for optically modulating the output of a pump light source, the modulator comprising:

a first optical coupler having a first input port, a second input port and at least one output port, the first input port receiving optical power at a first wavelength from the pump light source and the second input port receiving optical power at a second wavelength from a signal light source, said first optical coupler combining both the power received at the first input port and the power received at the second input port and directing the combined power to substantially only one of the at least one output ports of the first optical coupler;

an optical fiber having an input end and an output end and exhibiting Raman gain, with the input end of said fiber optically coupled to said one output port of the first optical coupler and receiving the combined power, wherein said combined power undergoes Raman scattering in said optical fiber so that the respective optical power received at the output end of the optical fiber at the first and second wavelength is dependent on the respective optical power supplied to the first and second input ports of the first coupler; and a second optical coupler having at least one input port and two output ports, one of the at least one input ports of the second optical coupler optically coupled to the output end of the optical fiber for receiving from the optical fiber the Raman scattered power and directing the portion of the Raman scattered power at the first wavelength to one of the output ports of the second coupler and directing the portion of Raman scattered power at the second wavelength to the other output port of the second coupler.

2. The modulator of claim 1, wherein the second optical coupler is wavelength-selective.

3. The modulator of claim 2, wherein the pump laser is a rare-earth doped fiber laser.

4. The modulator of claim 3, wherein the dopant of the rare-earth doped fiber laser is Nd, Yb or Er.

5. The modulator of claim 1, wherein the signal light source is a signal laser.

6. The modulator of claim 5, wherein the signal laser comprises a semiconductor laser, a solid-state laser, a Raman laser or a fiber laser.

7. The modulator of claim 6, wherein the signal laser lases in a single spatial mode.

8. The modulator of claim 1, wherein the signal light source is modulated between an "ON" state and an "OFF" state.

9. The modulator of claim 8, wherein the ratio of the modulated signal power between the "ON" state and the "OFF" state is at least 20 dB.

10. The modulator of claim 8, wherein the ratio of the modulated signal power between the "ON" state and the "OFF" state is between 20 dB and 40 dB.

11. The modulator of claim 1, wherein the optical fiber is doped with germanium.

12. The modulator of claim 11, wherein the optical fiber contains between 2 mol % and 30 mol % germanium.

13. The modulator of claim 1, wherein the pump light source is a pump laser.

14. The modulator of claim 13, wherein the pump laser comprises a semiconductor laser, a solid-state laser or a fiber laser.

15. The modulator of claim 1, wherein the optical fiber is a silica fiber.

16. The modulator of claim 1, wherein the optical fiber is doped with elements selected from the group consisting of Ge, As, Sb, Bi, Pb and Tl.

17. The modulator of claim 1, wherein the first optical coupler is wavelength-selective.

18. The modulator of claim 1, wherein the radiated optical power of the high power light source is at least 1 Watt.

19. The modulator of claim 1, wherein the optical fiber has a length between 10 m and 1000 m.

20. The modulator of claim 1, wherein the difference between the first wavelength and the second wavelength corresponds to a Stokes shift in the optical fiber.

21. An optical radiation source comprising:

a pump light source emitting pump power at a first wavelength;

a signal light source emitting signal power at a second wavelength and capable of being externally modulated;

a modulator comprising:

a first coupler having a first input port, a second input port and at least one output port, the first input port optically coupled to the pump light source and receiving pump power, the second input port optically coupled to the signal light source and receiving signal power, said first optical coupler combining the pump power and the signal power and directing the combined power to substantially only one of the at least one output ports of the first optical coupler;

an optical fiber having an input end and an output end and exhibiting Raman gain, with the input end of said fiber optically coupled to said one output port of the first optical coupler and receiving the combined power, wherein said combined power undergoes Raman scattering in said optical fiber so that the respective optical power received at the output end of the optical fiber at the first and second wavelength is dependent on the respective pump power and signal power supplied to the first and second input ports of the first coupler; and a second coupler having at least one input port and two output ports, one of the at least one input ports optically coupled to the output end of the optical fiber for receiving from the optical fiber the Raman scattered power and directing the portion of the Raman scattered power at the first wavelength to one of the output ports of the second coupler and directing the portion of Raman scattered power at the second wavelength to the other output port of the second coupler;

wherein the Raman scattered power at the respective first and second output port of the second coupler changes according to the signal power.

22. The optical radiation source of claim 21, further comprising optical fiber means suitable for attachment to at least one of the output ports of the second coupler for guiding the respective Raman scattered power to a remote target.

23. The optical radiation source of claim 21, wherein said remote target is an image receiving media.

24. A method for modulating high power optical radiation at a first wavelength with an optical signal at a second wavelength, the method comprising the steps of:

combining said high power optical radiation with the optical signal to form a combined signal;

conveying the combined signal to one end of a nonlinear optical fiber and copropagating the combined signal in said nonlinear optical fiber such as to cause transfer of at least a portion of the high power optical radiation at the first wavelength in the combined signal to the second wavelength along the length of said nonlinear optical fiber, thereby generating high power radiation at the second wavelength;

separating at the other end of the nonlinear optical fiber the high power radiation at the second wavelength from the portion of the high power radiation at the first wavelength which is not transferred to the second wavelength;

wherein the separated radiation at both the first wavelength and the second wavelength is modulated according to the modulation of the optical signal.

* * * * *